United States Patent
Munz

(10) Patent No.: US 6,735,495 B2
(45) Date of Patent: May 11, 2004

(54) POLYNOMIAL AND SPLINE INTERPOLATION OF MACHINE TOOL ORIENTATIONS

(75) Inventor: Martin Munz, Leonberg (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/328,728

(22) Filed: Dec. 23, 2002

(65) Prior Publication Data

US 2003/0125830 A1 Jul. 3, 2003

(30) Foreign Application Priority Data

Dec. 21, 2001 (DE) .......................... 101 63 503

(51) Int. Cl.$^7$ .............................................. G06F 19/00
(52) U.S. Cl. ...................... 700/189; 700/187; 700/188
(58) Field of Search ................. 700/189, 188, 700/187

(56) References Cited

U.S. PATENT DOCUMENTS

| | | | | |
|---|---|---|---|---|
| 4,772,831 A | * | 9/1988 | Casler et al. | 318/568.15 |
| 4,843,287 A | * | 6/1989 | Taft | 318/568.16 |
| 5,710,709 A | * | 1/1998 | Oliver et al. | 700/184 |
| 5,726,896 A | * | 3/1998 | Jia et al. | 700/187 |
| 2003/0033050 A1 | * | 2/2003 | Yutkowitz | 700/189 |

FOREIGN PATENT DOCUMENTS

| | | |
|---|---|---|
| DE | 235 740 A1 | 5/1986 |
| DE | 43 10 126 A1 | 10/1994 |
| EP | 0 268 491 A2 | 5/1988 |
| EP | 0 380 678 B1 | 12/1994 |
| EP | 0 335 984 B1 | 7/1995 |

OTHER PUBLICATIONS

"Spline–Interpolation für fünfachsige Fräsbearbeitung", Dr.–Ing. A. Potthast and Dipl.–Math B. Oder Berlin, Carl Hanser Verlag, Munich, ZwF 85 (1990), pp. 421–426.

\* cited by examiner

Primary Examiner—Leo Picard
Assistant Examiner—Michael D. Masinick
(74) Attorney, Agent, or Firm—Henry M. Feiereisen

(57) ABSTRACT

In a method and apparatus for guiding the motion of a moveable machine element, the orientation of the machine element is defined by an orientation vector that can be programmed in each set. The orientation vector can be obtained by a linear great circle interpolation in a plane spanned by a start vector and an end vector. In more general cases, polynomials can be used in the program, enabling an almost arbitrary definition of the path that determines how the end vector is obtained. The interpolated orientation vector can also be rotated out of the plane by an arbitrary angle. An extended interpolation permits a representation of orientation changes on a conical surface having an arbitrary orientation in space. This enables the orientation axes to move across several sets with continuous velocity and acceleration.

10 Claims, 1 Drawing Sheet

POLYNOMIAL AND SPLINE INTERPOLATION OF MACHINE TOOL ORIENTATIONS

CROSS-REFERENCES TO RELATED APPLICATIONS

This application claims the priority of German Patent Application, Serial No. 101 63 503.6, filed Dec. 21, 2001, pursuant to 35 U.S.C. 119(a)-(d), the disclosure of which is incorporated herein by reference.

BACKGROUND OF THE INVENTION

The present invention relates to a method and a numerical controller for guiding a motion of a movable machine element of a numerically controlled industrial processing machine, such as a machine tool, a robot and the like.

The orientation of tools used in industrial processing machines, for example machine tools with continuous kinematical orientation of tools in space, is typically programmed for each set. For example, the tool orientation can be programmed either directly by indicating the rotation axes positions. Alternatively, a more elegant method includes programming the orientation of the tool in space by way of orientation vectors.

In typical situations, an orientation is programmed in each NC set that is to be attained at the end of the set. The orientation is typically changed between the start vector and the end vector by a great circle interpolation, i.e., the orientation vector is rotated in a plane spanned by the start vector and the end vector. The angle relative to the start vector is hereby linearly interpolated.

When the orientations are interpolated with a great circle interpolation over several consecutive sets, the orientation vector typically changes its direction abruptly at the transitions between sets. This causes discontinuous changes in the velocity and acceleration of the rotation axes at the transitions between sets. This means that the great circle integration is not able to generate a motion with a constant velocity and acceleration of the orientation axes over several sets.

This situation occurs for normal linear axes, when only G1 sets are interpolated. A motion with a continuous acceleration can be achieved with the linear axes if polynomials are used for interpolating the axes. However, a method used with linear axes cannot easily be applied to orientations without taking into account the special properties of the orientation vectors. Moreover, even with "normal" axis interpolation, polynomials can also be programmed for the axes motion in addition linear sets and circles. This allows complex geometries to be programmed. However, such a such an interpolation method cannot be applied to orientation vectors.

It would therefore be desirable and advantageous to provide an improved control method to obviate prior art shortcomings and capable of programming polynomials for changing orientation vectors. It would further be desirable and advantageous to provide a motion of the orientation axes with continuous velocity and continuous acceleration over several sets.

SUMMARY OF THE INVENTION

According to one aspect of the invention, a control method for guiding a motion of a movable machine element of a numerically controlled industrial processing machine is provided that includes the steps of orienting the machine element in a workspace using orientation vectors, subdividing an orientation and a motion path of the machine element into a plurality of sequential contiguous motion segments, changing the orientation of the machine element within a motion segment by tilting an orientation vector from a start vector to an end vector about a first angle in a plane spanned by the start vector and end vector and about a second angle perpendicular to that plane, and interpolating the first and second angles of orientation vectors over several motion segments.

In this way, an orientation vector can be programmed in each set, wherein the orientation vector can be arrived at via a great circle interpolation (i.e., a linear interpolation of the angle in the plane which is spanned by the start actor and the end vector). The programming polynomials can define an almost arbitrary "path" by which this end vector can be attained. In a more general case, the interpolated orientation vector is no longer located in the plane between the start vector and the end vector, but can be rotated arbitrarily out of this plane.

According to another feature of the present invention, the two angles of the orientation vectors may be interpolated by a polynomial interpolation over several motion segments. The constant and the linear efficient of a polynomial for the polynomial interpolation can be defined by the start value or end value of an orientation vector.

The angles of orientation vectors can also be interpolated over several motion segments by a spline interpolation.

A method according to the present invention can be suitably applied to a movable machine element implemented as a tool of a processing machine wherein the orientation vector describes a curve of the tool tip in space.

In the aforedescribed great circle interpolation, the tool orientation is interpolated in a plane spanned by the start orientation and the end orientation. The orientation vector can be tilted out of this plane by programming additional polynomials according to the invention. However, even this type of interpolation can only approximately interpolate the orientation vector on a conical surface.

Such orientation changes cannot be interpolated in a single set, and sets will typically have to be subdivided depending on the desired accuracy. This results in consecutive, typically short sets, wherein the orientation change is interpolated via great circle interpolation. In addition, these orientation changes can be smoothed, so that overall a smooth orientation curve can be achieved. However, the orientation changes required when which machining, for example, a circular contour with a constant tool setting angle (inclination), still cannot be described exactly. The orientation vectors are here interpolated over several motion segments, in the same manner circles are interpolated in a plane.

With the enhanced orientation interpolation according to the invention, orientation changes can be described on a conical surface with an arbitrary location/orientation in space. Hereby, a first angle may represent a rotation angle of an orientation about the center axis of the cone and a second angle may represent the apex angle. Accordingly, the coefficients of the polynomials or splines for interpolating an orientation of the machine element can be selected so that the motion of the orientation axes of the machine element has a continuous velocity and/or continuous acceleration.

The method of the invention can be carried out with a suitably programmed numerical controller.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
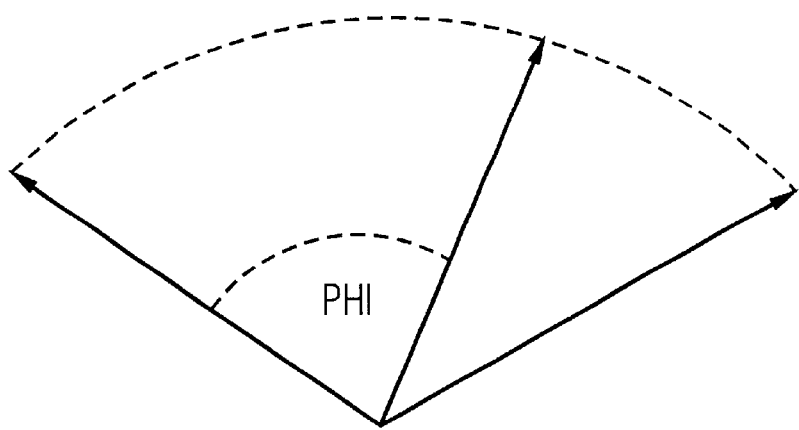
FIG. 1 is a schematic diagram indicating the rotation of an orientation vector in a plane between a start vector and an end vector.

Throughout all the Figures, same or corresponding elements are generally indicated by same reference characters. These depicted embodiments are to be understood as illustrative of the invention and not as limiting in any way.

As mentioned above, conventional axis interpolation allows direct programming of polynomials for axes motion in addition to programming linear sets and circles, thereby enabling programming of complex geometries. The present invention extends this possibility to the interpolation of orientation vectors.

Accordingly, in each set an orientation vector can be programmed which is then not only reached by a great circle interpolation (i.e., by a linear interpolation of the angle in the plane spanned by the start vector and the end vector). Programming polynomials according to the invention even for orientation vectors allows an almost arbitrarily defined path to an end vector. In a general case, the interpolated orientation vector is no longer in the plane spanned by the start vector and the end vector, but can be arbitrarily rotated out of that plane.

The aforedescribed possibilities for programming the tool orientation make it possible to generate NC programs which can be executed unaltered on machines having different kinematics (standard five-axis machines with different arrangements of the orientation axes as well as parallel kinematical machines, such as for example hexapods, etc.). The same options exist for programming the tool orientation as for programming the tool paths. The aforedescribed interpolation types for the orientation, such as polynomials and conical surfaces, can be applied to processing programs wherein all participating machine axes exhibit continuous acceleration.

Possible approaches for programming the tool orientation are illustrated with reference to the following exemplary embodiments. In these examples, only the orientation changes are programmed, wherein in actual applications the movement of the tool also has to be indicated. The identifiers for programming are meant to be exemplary and can be replaced by other identifiers.

The orientation vectors according to the invention can be programmed in different ways:
1. Programming of the rotation axis positions with A, B and C or the actual rotation axis identifiers.
2. Programming in Euler angle or RPY-angle via A2, B2, C2.
3. Programming of the direction vector via A3, B3, C3.
4. Programming via lead angle LEAD and tilt angle TILT.
   This type of interpolation of the orientation is selected by using the following program commands:
ORIAXES: interpolation of the machine axes
ORIVECT: integration of the orientation vector In the first interpolation type, the changes in the orientation depend on the respective machine kinematics. A kinematics-independent orientation change is obtained only if the orientation vectors in the second case is interpolated directly.

The different interpolation types can be selected, for example, by a program command valid for a certain mode:
ORIPLANE=orientation interpolation in a plane (great circle interpolation).
ORICONCW=orientation interpolation on a cone clockwise.
ORICONCCW=orientation interpolation on a cone counterclockwise.
ORICONIO=orientation interpolation on cone with intermediate orientation.
ORICONTO=orientation interpolation on a cone with tangential orientation.

Additional information may be required for the respective program commands. The start orientation is generally defined by the previous set. The end orientation is defined either by defining the vector (with A3, B3, C3), the Euler angle or RPY-angle (with A2, B2, C2) or by programming the rotation axis positions (with A, B and C).

The angle polynomials are programmed as follows:
PO[PHI]=(a2, a3, a4, a5)
PO[PSI]=(c2, c3, c4, c5)

In other words, the constant and linear coefficients of the angle polynomials cannot be programmed. These coefficients are determined by the start orientation and the end orientation.

In the following examples it is assumed that the initial orientation points along the z-direction (A3=0, B3=0, C3=1).

1. Interpolation in a plane (great circle interpolation)
   A3=1 B3=0 C3=0
   The orientation is here rotated in the xz-plane by 90 degrees.
2. Polynomial interpolation
   A3=1 B3=0 C3=0
   PO[PHI]=(a2,a3,a4,a5) PO[PSI]=(b2,b3,b4,b5)
   The end orientation points in the x-direction. The interpolation is performed according to the angle polynomials for PHI and PSI and can be rotated arbitrarily out of the xz-plane.
3. Counter-clockwise cone interpolation
   A3=1 B3=0 C3=1
   ORICONCCW A3=0 B3=1 C3=1 A6=0 B6=0 C6=1
   The orientation is first rotated by 45 degrees in the xz-plane, and then moved counterclockwise by 90 degrees on a cone in the z-direction (A6=0, B6=0, C6=1).
4. Clockwise cone interpolation
   A3=1 B3=0 C3=1
   ORICONCW A3=0 B3=1 C3=1 A6=0 B6=0 C6=1
   The orientation moves clockwise by 270 degrees on a cone in the z-direction.
5. Interpolation of a complete cone
   A3=1 B3=0 C3=1
   ORICONCW A6=0 B6=0 C6=1
   The orientation moves clockwise by 360 degrees on a cone in the z-direction.
6. Cone interpolation with specified apex angle
   A3=1 B3=0 C3=1
   ORICONCW A3=0 B3=1 C3=1 NUT=45
   The orientation moves clockwise by 270 degrees on a cone with an apex angle of 45 degrees.
7. Cone interpolation with a specified intermediate orientation
   A3=1 B3=0 C3=1
   ORICONIO A3=−1 B3=0 C3=1 A7=0 B7=1 C7=1
   The orientation moves by 180 degrees on a cone in the z-direction, wherein the cone is defined by the intermediate orientation (A7=0, B7=1, C7=1).

The invention can be implemented in software in the numerical controller, for example in the programming language C++, as follows.

The change in the orientation vectors is completely described by a class Ocurve. This class provides to the interpolator via a function orientation(s) the actual values of the orientation vector or its derivative with respect to the path parameter s, which are required for moving the orientation axes.

The class Ocurve includes the data and functions that are required for describing the interpolation from a start vector to an end vector. This class can include the following data and functions:

Polynomial phi; rotation angle in the plane spanned by the start vector and end vector.

Polynomial psi; angle of the orientation vector relative to this plane.

Vector verticalVector; (constant) vector oriented perpendicular to the start vector and the end vector.

double length ( ) yields a numerical calculation of the "length" of the Ocurve.

Vector orientation(s) yields the actual orientation vector for the path parameter s.

Vector tangent(s) yields the normalized derivative vector of the orientation for the path parameter s.

Vector unnorm Tangent(s) yields the un-normalized derivative vector of the orientation for the path parameter s.

For initializing a general interpolation of orientation vectors, the constructor Ocurve::Ocurve(const Vector& start, const Vector& end, const Polynom& phiP, const Polynom& psiP)

is used. Start and end refers hereby to the start and end vectors, and phiP and psiP can be used to define (arbitrary) polynomials for the angles phi and psi.

Additional constructors are used to initialize the interpolation of the orientation on a conical surface with a defined start and end orientation and direction vector, apex angle or intermediate orientation.

Figure 2:
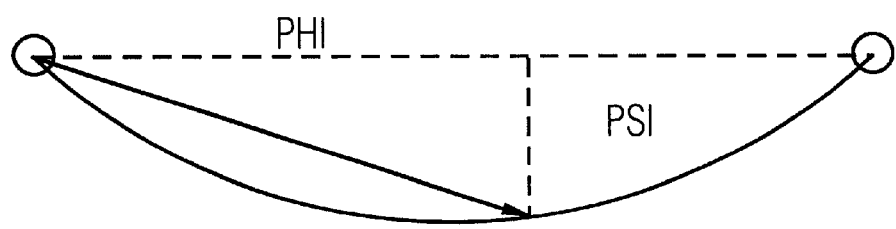
FIG. 2 is a top view of a motion of the orientation vector according to the invention.

The diagram of FIG. 1 shows the rotation of an orientation vector in a plane between start vector and the end vector by an angle PHI according to an interpolation referred to as "great circle interpolation". A motion of the orientation vector perpendicular to this plane can be generated with the second angle PSI. This relationship is illustrated in FIG. 2 in a top view.

In practice, an at least $5^{th}$ order polynomial should be programmed for these angles. The constant coefficient and the linear coefficient are defined by the initial value and the end value of the orientation vector. Any higher order coefficients equal to 0 can be omitted from the list of coefficients. In addition, the variable PL can be used to program the length of the parameter interval in which the polynomials are defined. Both angles PHI and PSI are expressed, for example, in degrees.

Corresponding functions having the aforedescribed functionality can be implemented in a numerical controller, for example, with

POLY

Switching on the polynomial interpolation for all axis groups.

POLYPATH ( )

Switching on the polynomial interpolation for selective axis groups, with possible groups being "AXES" and "VECT".

PO[PHI]=(a2, a3, a4, a5)

The angle PHI is interpolated according to PHI(u)=a0+ a1*u+a2*u2+a3*u3+a4*u4+a5*u5. The coefficients are stated in degrees.

PO[PSI]=(b2, b3, b4, b5)

The angle PSI is interpolated according to PSI(u)=b0+b1*u+ b2*u2+b3*u3+b4*u4+b5*u5. The coefficients are stated in degrees.

PL

Length of the parameter interval in which the polynomials are defined. The interval always starts at 0. Values for PL can theoretically range between 0, 0001 and 99999.9999. The quantity PL is valid for the set to which it belongs. If no value for PL is programmed, then PL is set=1.

If no polynomial is programmed for the angle PSI, then the orientation vector is always interpolated in the plane spanned by the start and end vectors. The angle PHI in this plane is interpolated according to the polynomial programmed for PHI. The orientation vector can be moved in the plane between the start vector and the end vector according to a "typical" great circle interpolation, while still performing a more or less non-uniform motion depending on the programmed polynomials. This can also affect the velocity and acceleration curves of the orientation axes within a set.

The following section describes the mathematical foundation for polynomial interpolation of orientations according to the present invention:

It is desired to achieve a general interpolation of an orientation vector between two predefined vectors, the start vector and the end vector. A general vector which interpolates between the start vector and the end vector, is decomposed into components:

$$o = \sin \psi v + \cos \psi w$$

wherein the vector v which is normalized to a length 1 is perpendicular to the start vector s and the end vector e:

$$v = \frac{s \times e}{|s \times e|}$$

In the following, it will be assumed that the defined start and end vectors s and e are normalized to a length of 1. The vector w is in the plane spanned by the vectors s and e and is therefore orthogonal to the vector v, i.e.

$$v \cdot w = 0$$

The vector w is not constant, but is rotated in the plane perpendicular to v. Defining the angle φ path the angle between the vector w and the start vector s, one obtains:

$$w = \cos \phi s + \sin \phi n$$

wherein the normalized vector $$n = \frac{v \times s}{|v \times s|}$$

is perpendicular to the vectors s and v:

$$s \cdot n = v \cdot n = 0$$

In other words, the vectors s, v and n form an orthogonal coordinate base system. Accordingly, an arbitrary orientation vector can be represented in the following form:

$$o(\phi, \psi) = \sin \psi v + \cos \psi (\cos \phi s + \sin \phi n)$$

It follows $$o \cdot o = 1$$

In other words, the normalization of the vector $o(\psi, \phi)$ is preserved for arbitrary angles $\phi$ and $\psi$. For an arbitrary orientation change, the tip of the orientation vector follows an arbitrary curve on the unit sphere.

In this general representation of an orientation vector, the angles $\phi$ and $\psi$ can be arbitrary functions of the path parameter $\mu$.

In special case of great circle interpolation (GCI), wherein the orientation change takes place only in the plane between the start and end vector, one obtains for $\psi=0$:

$$o(\phi) = \cos\phi\, s + \sin\phi\, n$$

The general representation of the orientation vector can also be interpreted as two superimposed great circle interpolations. The first GCI is a rotation about the angle $\phi$, starting at the start vector s, in the plane between the start and end vector, resulting in the vector w, and the second GCI is a subsequent rotation about the angle $\psi$, starting from the vector w, in the plane spanned by the vectors w and v, and oriented perpendicular to the first rotation plane.

In the general representation of an orientation vector, the first two angle functions can be arbitrary functions of $\phi(u)$ and $\psi(u)$ of the interpolation parameter u. Therefore, the derivatives required for interpolating the orientation can be computed in general form. In addition, the total orientation change can be computed from the two angle functions. Accordingly, the total orientation change is:

$$\Delta = \int_0^1 du \left| \frac{\partial o(\phi(u), \psi(u))}{\partial u} \right|$$

assuming that the interpolation parameter u is normalized to the interval $0 \leq u \leq 1$. Using the general representation of an orientation vector, one obtains:

$$\Delta = \int_0^1 du \left[ \left(\frac{d\psi(u)}{du}\right)^2 + \cos^2\psi \left(\frac{d\phi(u)}{du}\right)^2 \right]^{1/2}$$

This integral can be computed for a general case only by numerical methods. In the special case of a great circle integration, one obtains with $\psi=0$:

$$\Delta = \int_0^1 du \left| \frac{d\phi(u)}{du} \right| = \phi(1) - \phi(0)$$

This demonstrates that the "shortest" curve between a start orientation and an end orientation is described by the great circle interpolation. All other orientation changes always have a greater length.

For computing the angles $\phi$ and $\psi$ of a defined orientation vector o, the general representation of an orientation has to be solved for the angles $\phi$ and $\psi$. One obtains by scalar multiplication with v:

$$\psi = a\sin(o \cdot v)$$

and by multiplication with s:

$$\phi = a\cos\left( \frac{o \cdot s}{\sqrt{1 - (o \cdot v)^2}} \right)$$

In this way, the angles $\phi$ and $\psi$ can be computed for a vector o that is not parallel to v.

In particular, the start angle and the end angle can be determined with the boundary conditions:

$$o(\phi=0, \psi=0) = s$$

$$o(\phi=\phi_e, \psi=\psi_e) = e$$

One then obtains $$o_e = a\cos(s \cdot e)$$

$$\psi_e = n\pi$$

with $n=1, 2, \ldots$. This ambiguity in determining the end angle $\psi_e$ means that the same end vector can be obtained in different ways. The simplest possibility (n=0) represents a rotation of the orientation vector via GCI in the plane between the start and end vector. Alternatively, the orientation vector can oscillate perpendicular to this plane. In principle, ambiguities also exist in the determination of $\phi_e$. However, these ambiguities refer to a multiple complete rotation of the orientation vector about the unit sphere, which will not be discussed.

So far, the angles $\phi$ and $\psi$ can be arbitrary functions of the path parameter u. In the following, these angle functions will be limited to polynomials of the path parameter u.

It will not be assumed that the two angles can be represented by polynomials:

$$\phi(u) = \sum_{i=0}^{i=N} a_i u^i$$

$$\psi(u) = \sum_{i=0}^{i=N} b_i u^i$$

By requiring that the start vector should be reached for u=0 and for u=1 the end vector should be reached for u=1 one obtains the following conditions for the polynomial coefficient:

$$o(u=0) = s \Rightarrow \phi(u=0) = \psi(u=0) = \Rightarrow a_0 = b_0 = 0$$

and $$o(u=1) = e \Rightarrow \phi(u=1) = \phi_e; \; \psi(u=1) = 0$$

This yield the following conditions for the linear polynomial coefficients:

$$a_1 = \phi_e - \sum_{i=2}^{i=N} a_i$$

$$b_1 = -\sum_{i=2}^{i=N} b_i$$

In the special case of a linear polynomial, i.e., $a_i = b_i = 0$ for $i = 2, 3, 4, \ldots$ one obtains for the great circle interpolation:

$$\phi(u) = \phi_e u$$

$$\psi(u) = 0$$

For two consecutive motion segments (NC sets), whose angle functions are referred to as $\phi_1, \psi_1$ and $\phi_2, \psi_2$, and under the condition that the orientation change between the two motion segments is C2-continuous, one obtains for the coefficients of the angle polynomials:

$$\frac{do_1(\phi_{1e}, \psi_{1e})}{du} = \frac{do_2(\phi_2 = 0, \psi_2 = 0)}{du}$$

$$\frac{d^2 o_1(\phi_{1e}, \psi_{1e})}{du^2} = \frac{d^2 o_2(\phi_2 = 0, \psi_2 = 0)}{du^2}$$

An exemplary case with two consecutive orientation changes is, for example:

$s_1=(0,0,1) \Rightarrow e_1=(1,0,0)$ $s_2=(0,0,1) \Rightarrow e_2=(0,1,0)$

If these orientation changes are interpolated as described above, then the orientation abruptly changes at the transition between the two segments, causing a discontinuity in the velocities and accelerations of the corresponding orientation axes. By programming suitable polynomials for the two angles $\phi$ and $\psi$ this orientation change can be interpolated to yield a continuous acceleration. These polynomials are defined by the conditions that the orientation vector and its first and second derivatives are continuous at the transition between sets. From the general continuity conditions, one obtains for this example:

$$\frac{d\phi_2}{du} = \frac{d\psi_1}{du}$$

$$\frac{d\psi_2}{du} = -\frac{d\phi_1}{du}$$

$$\frac{d^2\phi_2}{du^2} = \frac{d^2\psi_1}{du^2}$$

$$\frac{d^2\psi_2}{du^2} = -\frac{d^2\phi_1}{du^2}$$

The following solution trial is made for the two angle polynomials:

$$\phi_{1,2}(u) = a_{1,2}^0 + a_{1,2}^1 u + a_{1,2}^2 u^2$$

$$\psi_{1,2}(u) = b_{1,2}^0 + b_{1,2}^1 u + b_{1,2}^2 u^2$$

The coefficients of the polynomials can be computed with the aforementioned continuity conditions, so that one obtains for the angle polynomials:

$$\phi_1(u) = \frac{3}{4}\pi u - \frac{1}{4}\pi u^2$$

$$\psi_1(u) = -\frac{1}{4}\pi u + \frac{1}{4}\pi u^2$$

$$\phi_2(u) = \frac{1}{4}\pi u + \frac{1}{4}\pi u^2$$

$$\psi_2(u) = -\frac{1}{4}\pi u + \frac{1}{4}\pi u^2$$

For programming orientations of a tool which are independent of the specific kinematics of the machine, there exists the possibility—as described above—of a great circle interpolation. The orientation vector is hereby rotated in the plane spanned by the start orientation and the end orientation. This is accomplished by a (typically) linear interpolation of the angle enclosed between the orientation vector and the start orientation.

This representation of the orientation vector known from conventional interpolations is ill suited to describe an interpolation of the orientation vector wherein the orientation changes along a conical surface. The tip of the orientation vector moves on a circular path.

In the following, an extended interpolation of the orientation vector according to the invention is described which accommodates such orientation changes.

With the great circle interpolation, the tool orientation is interpolated in a plane spanned by the start and end orientation. The orientation vector can also be tilted out of that plane by programming additional polynomials according to the invention. However, even then, the interpolation of the orientation vector on a conical surface can only be described as an approximation.

In conventional processes, such orientation changes cannot be described in a single set, and the set may have to be subdivided depending on the required accuracy. In this case, one obtains consecutive, typically short sets in which the orientation change is interpolated by great circle interpolation. In addition, these orientation changes can be smoothed so that a generally smooth orientation curve can be obtained. However, a required orientation change can still not be described exactly, for example, where a circular contour is to be machined with a constant inclination of the tool.

With a suitably extended integration of orientation, orientation changes can be described on a conical surface having an arbitrary orientation in space. The vector about which the tool orientation is to be rotated has to be known. In addition, the start and end orientations have to be defined. The start orientation is hereby always defined by the previous set, whereas the end orientation has to be the programmed or defined through other conditions.

The great circle interpolation together with programming angle polynomials corresponds to a linear and polynomial integration of contours. Conversely, the extended interpolation of the orientations of a conical surface corresponds to an interpolation of circles in a plane. Accordingly, different programming possibilities in analogy to programming of circles exist. These correspond to the programming possibilities of circles, such as G2/G3 (center or the radius defined), CIP (circle via intermediate point) and CT (tangential circle).

The rotation axis of the cone is programmed with A6, B6, C6 as a (normalized) vector. The apex angle of the cone is programmed as a nutation angle NUT in degrees. The value of his angle is limited to the interval 0<NUT<180 degrees. The rotation axis of the cone and the apex angle cannot be defined simultaneously.

If an angle is programmed that lies outside a valid interval, an alarm is activated. In a special case NUT=180 degrees, the orientation vector is interpolated in a plane perpendicular to the direction vector (great circle interpolation). The sign of the programmed apex angle indicates if the positioning angle is greater or smaller than 180 degrees.

In addition, polynomials can be programmed for the two angles PHI and PSI. PHI is here the rotation angle of the orientation about the direction axis of the cone and PSI is the apex angle of the cone.

These polynomials are programmed in a manner described above:

PO[PHI]=(a2, a3, a4, a5)

PO[PSI]=(b2, b3, b4, b5)

In other words, polynomials of maximal $5^{th}$ order can be programmed. The constant and linear coefficients are defined by the start and end orientation.

For example, the apex angle of the cone is programmed by specifying NUT=. . . . This can be done if either the G-code ORICONCW or the G-code ORICOCCW are active. An end orientation must be defined. It is not possible to interpolate an entire envelope of the cone of 360 degrees in this manner. The sign of the apex angle indicates if the positioning angle is to be greater or smaller than 180 degrees, wherein NUT=+... positioning angle less than or equal to 180 degrees NUT=−... positioning angle greater than or equal to 180 degrees The positive sign can be omitted in the program.

An intermediate orientation can be programmed with the indicators A7, B7, C7. This is possible when the G-code ORICONIO is active. An end orientation must be defined. The orientation change is uniquely defined by the three vectors, start orientation, end orientation and intermediate orientation. All three vectors have to be different from each other. The rotation direction is defined by the three vectors, start orientation, end orientation and intermediate orientation. If the programmed intermediate orientation is parallel to the start or end orientation, then the orientation is interpolated by a linear great circle interpolation in the plane spanned by the start and end vector.

The type of interpolation is selected, for example, with the modal G-codes of the G-code group 51. Typically, only the two G-codes ORIAXES, ORIVECT and ORIPATH are included in such a group. The programmed end orientation in ORIAXES is obtained by a interpolation of the orientation axes. ORIVECT directly interpolates the orientation vector, with the resulting movements of the orientation axes being determined by the specific kinematics of the machine. If ORIPATH is active, then the orientation change relative to the surface normal is defined by angles programmed with LEAD and TILT.

The aforedescribed function Ocurve does not have to be extended for implementing the extended orientation interpolation of a conical surface according to the present invention. The interpolation on a conical surface can also be performed with an existing implementation of the orientation interpolation, if the basis vectors and the angles in Ocurve are suitably defined. In other words, only new constructors have to be introduced into Ocurve for interpolating a conical surface.

The mathematical basis for a conical interpolation of orientations according to the invention will now be described:

An orientation vector to be interpolated on a conical surface having a normalized direction vector d can be represented in general form as:

$$o = \cos \psi d + \sin \psi (\cos \phi \, p + \sin \phi p_n)$$

With the orthogonal and normalized basis vectors $$p = \frac{s - (s \cdot d)d}{\sqrt{1 - (s \cdot d)^2}}$$

$$p_n = d \times p,$$

wherein s is the normalized start vector and wherein the angles $\phi$ and $\psi$ can be represented as polynomials of the interpolation parameter u. With the boundary conditions for these angle functions, the following equations are obtained:

$$\phi(u=0) = 0, \phi(u=1) = \phi_e = a\tan\left(\frac{e \cdot p_n}{e \cdot p}\right)$$

$$\psi(u=0) = \psi_0 - a \cos(s \cdot d),$$

wherein e is the normalized end vector of the orientation. In the simplest case, $\phi(u) = \phi_e u$ and $\psi(u) = \psi_0 = \text{const}$. In this way, an interpolation of the orientation vector on the conical surface is obtained.

However, "spiral-shaped" orientation changes are also possible, whereby the apex angle of the cone changes linearly. In this case, one sets $$\psi(u) = \psi_0 + (\psi_1 - \psi_0)u$$

$$e \cdot d = \cos \psi_1$$

wherein e is the normalized end vector.

The normal vector $p_n$ determines if the interpolated orientation vector rotates clockwise or counterclockwise about the direction vector d of the cone.

Additional polynomials can be programmed for both the apex angle $\psi$ of the cone as well as for the rotation angle $\phi$, which makes possible orientation changes so that the orientation oscillates about a conical surface.

For a more general form of a conical interpolation, the corresponding basis vectors have to be defined. The start vector is always defined by the end orientation of the preceding motion segment. The end orientation has to be programmed in each motion segment. Additional information is required for defining the cone (direction vector d). The following possibilities exist:

1. Programming the direction vector
 2. Programming the apex angle of the cone
 3. Programming an intermediate orientation
 4. Tangential continuation of the orientation from the preceding motion segment. In this case, the first derivative of the orientation vector is defined at the beginning.

In the first case, the direction vector is defined directly, in all other cases it has to be first computed. However, this can be done in all cases in a unique manner.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. Control method for guiding a motion of a movable machine element of a numerically controlled industrial processing machine, comprising the steps of orienting the machine element in a workspace using orientation vectors;

subdividing an orientation and a motion path of the machine element into a plurality of sequential contiguous motion segments;

changing the orientation of the machine element within a motion segment by tilting an orientation vector from a start vector to an end vector about a first angle in a plane spanned by the start vector and end vector and about a second angle perpendicular to the plane, and interpolating the first and second angles of the orientation vector over several motion segments on a surface of a cone.

2. The control method of claim 1, wherein the first angle comprises an apex angle of the cone and the second angle comprises a rotation angle of the cone, and wherein the first and second angles are interpolated by a polynomial interpolation.

3. The control method of claim 1, wherein the first angle represents a rotation angle of an orientation vector about a center axis of the cone and the second angle represents an apex angle of the cone.

4. The control method of claim 2, wherein polynomial coefficients used in the polynomial interpolation are selected so that the orientation vector oscillates about the surface of the cone.

5. The control method of claim 1, wherein the industrial processing machine comprises at least one of a machine tool and a robot.

6. Numerical controller for guiding a motion of a movable machine element of a numerically controlled industrial processing machine, comprising:

means for orienting the machine element in a workspace using orientation vectors;

means for subdividing an orientation and a motion path of the machine element into a plurality of sequential contiguous motion segments;

means for changing the orientation of the machine element within a motion segment by tilting an orientation vector from a start vector to an end vector about a first angle in a plane spanned by the start vector and end vector and about a second angle perpendicular to the plane, and means for interpolating the first and second angles of the orientation vector over several motion segments on a surface of a cone.

7. The controller of claim 6, wherein the first angle comprises an apex angle of the cone and the second angle comprises a rotation angle of the cone, and wherein the first and second angles are interpolated by a polynomial interpolation.

8. The controller of claim 6, wherein the first angle represents a rotation angle of an orientation vector about a center axis of the cone and the second angle represents an apex angle of the cone.

9. The controller of claim 7, wherein polynomial coefficients used in the polynomial interpolation are selected so that the orientation vector oscillates about the surface of the cone.

10. The controller of claim 6, wherein the industrial processing machine comprises at least one of a machine tool and a robot.

* * * * *